United States Patent
Gupta et al.

(10) Patent No.: US 7,451,089 B1
(45) Date of Patent: *Nov. 11, 2008

(54) SYSTEM AND METHOD OF SPOKEN LANGUAGE UNDERSTANDING IN A SPOKEN DIALOG SERVICE

(75) Inventors: Narendra K. Gupta, Dayton, NJ (US); Mazin G. Rahim, Matawan, NJ (US); Giuseppe Riccardi, Hoboken, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/675,166

(22) Filed: Feb. 15, 2007

Related U.S. Application Data (63) Continuation of application No. 10/326,692, filed on Dec. 19, 2002, now Pat. No. 7,197,460.

(60) Provisional application No. 60/374,961, filed on Apr. 23, 2002.

(51) Int. Cl.
*G10L 11/00* (2006.01)
*G10L 21/00* (2006.01)

(52) U.S. Cl. ............ 704/270.1; 704/251; 704/275

(58) Field of Classification Search .......... None
See application file for complete search history.

(56) References Cited

U.S. PATENT DOCUMENTS

| | | | |
|---|---|---|---|
| 5,895,466 | A | 4/1999 | Goldberg et al. |
| 6,377,944 | B1 | 4/2002 | Busey et al. |
| 6,567,805 | B1 | 5/2003 | Johnson et al. |
| 6,766,316 | B2 | 7/2004 | Caudill et al. |
| 6,922,689 | B2 | 7/2005 | Shtivelman |
| 7,013,308 | B1 | 3/2006 | Tunstall-Pedoe |
| 2003/0004838 | A1 | 1/2003 | Kusuda et al. |
| 2004/0024739 | A1 | 2/2004 | Copperman et al. |

*Primary Examiner*—David R. Hudspeth
*Assistant Examiner*—Eunice Ng (57) ABSTRACT

A voice-enabled help desk service is disclosed. The service comprises an automatic speech recognition module for recognizing speech from a user, a spoken language understanding module for understanding the output from the automatic speech recognition module, a dialog management module for generating a response to speech from the user, a natural voices text-to-speech synthesis module for synthesizing speech to generate the response to the user, and a frequently asked questions module. The frequently asked questions module handles frequently asked questions from the user by changing voices and providing predetermined prompts to answer the frequently asked question.

15 Claims, 6 Drawing Sheets

SYSTEM AND METHOD OF SPOKEN LANGUAGE UNDERSTANDING IN A SPOKEN DIALOG SERVICE

PRIORITY DOCUMENTS

The present application is a continuation of U.S. patent application Ser. No. 10/326,692, filed Dec. 19, 2002, which claims priority to provisional application No. 60/374,961, filed Apr. 23, 2002, the contents of which are incorporated herein by reference.

RELATED APPLICATIONS

This case is related to commonly assigned U.S. patent application Ser. No. 10/235,266, filed on Dec. 19, 2002, the contents of which are incorporated herein by reference. This case is related to commonly assigned U.S. patent application Ser. No. 10/235,295, filed Dec. 19, 2002, the contents of which are incorporated herein by reference. This case is related to commonly assigned U.S. patent application Ser. No. 10/326,691, filed Dec. 19, 2002, the contents of which are incorporated herein by reference. The present application is related to commonly assigned U.S. patent application Ser. No. 10/160,461 filed May 31, 2002, the contents of which are incorporated herein by reference.

BACKGROUND OF THE INVENTION

1. Field of the Invention

The present invention relates to dialog systems and more specifically to an extended spoken language understanding module for handling frequently asked questions.

2. Discussion of Related Art

Voice-enabled applications are becoming more widespread as automatic speech recognition (ASR), spoken language understanding (SLU), dialog management (DM) and text-to-speech (TTS) synthesizers improve. These voice-enabled applications represent an evolution of traditional help desks that are currently available on the web or supported by human agents. The goals of a voice-enabled help desk include call routing to appropriate agents or departments, providing a wealth of information about various products and services, and conducting problem solving or trouble shooting.

Speech and language processing technologies have the potential of automating a variety of customer care services in large industry sectors such as telecommunications, insurance, finance, travel, etc. In an effort to reduce the cost structure of customer care services, many of these industries are depending more heavily on complex Interactive Voice Response (IVR) menus for either automating an entire transaction or for routing callers to an appropriate agent or department. Several studies have shown that the "unnatural" and poor user interfaces of such menus tend to confuse and frustrate callers, preventing the callers from accessing information, let alone obtaining, in many cases, obtaining the desired service they expect. For example, studies show that over 53% of surveyed consumers say that automated IVR systems are the most frustrating part of customer service. In one survey, 46% of consumers dropped their credit card provider and 30% of them dropped their phone company provider due to poor customer care.

The advent of speech and language technologies have the potential for improving customer care not only by cutting the huge cost of running call centers in general but also by providing a more natural communication mode for conversing with users without requiring them to navigate through a laborious touch-tone menu. This has the effect of improving customer satisfaction and increasing customer retention rate. These values, which collectively form the foundation for an excellent customer care experience, have been evident in the AT&T Call Routing "How May I Help You" service that provides national consumer services via an automated spoken dialog system.

Soon, speech and language technologies will play a more pivotal role in customer care service and in help desk applications where the objectives include call routing and accessing information, as well as solving technical problems, sales, recommendations, and trouble shooting. Many computing and telecommunication companies today provide some form of a help desk service through either the World Wide Web or using a human agent. There is an opportunity for spoken natural language interfaces to play a much bigger role in this industry.

Figure 1:
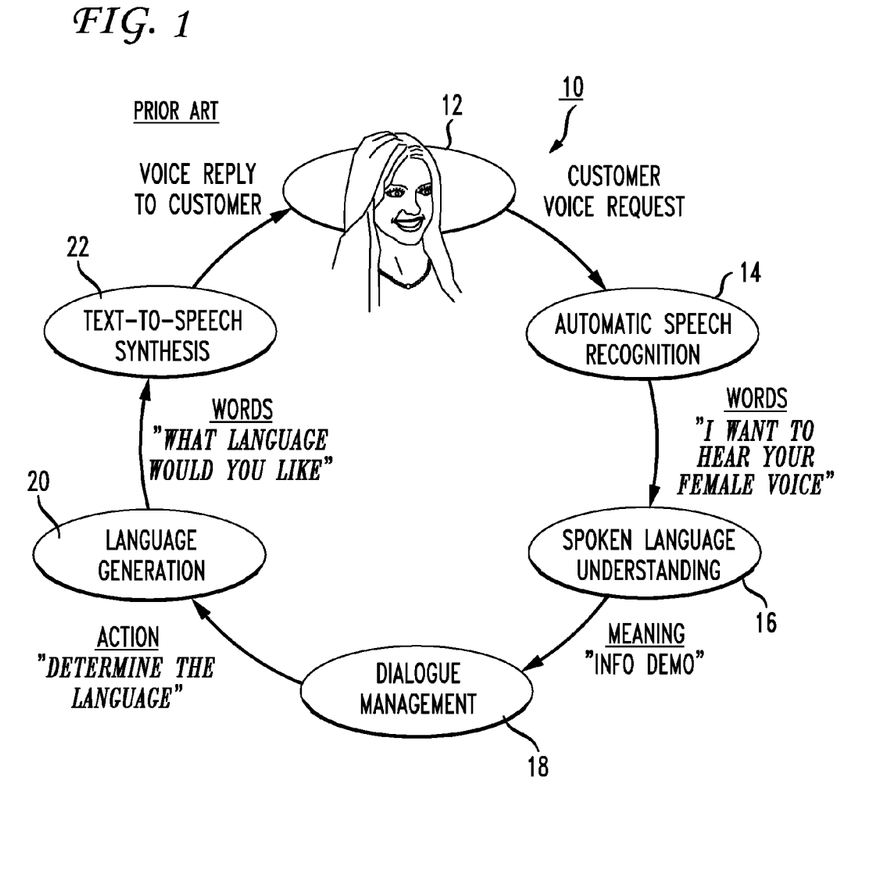
FIG. 1 illustrates the components of a general spoken dialog system.

FIG. 1 illustrates the basic components required for human-computer interactive spoken dialog systems 10. The customer 12 speaks and provides an audible voice request. An automatic speech recognition (ASR) module 14 recognizes the speech and provides the text of the speech to a spoken language understanding (SLU) module 16 that parses the natural language input into relevant information to determine the substance of the customer inquiry. A dialog manager (DM) 18 receives the information regarding what the customer asked and generates the substance of the response, which is transmitted to a language generator 20 for generating the text of the response. The response text is transmitted to a text-to-speech (TTS) module 22 for generating a synthetic voice that "speaks" the response to the customer 12.

Further, some systems that are deployed are programmed to follow a particular dialog flow to lead the customer to the proper destination or information. Often, various costumers will have common questions that are asked that perhaps may be outside the designed dialog flow. Previous systems fail to adequately and efficiently handle these kinds of frequently asked questions.

Current technologies fail to enable companies to afford generating automated help desks. Handcrafted systems require manual training, segmenting and labeling of data in preparation for the voice user interface in the particular domain of the company. The data required for handcrafted systems may comprise hours and hours of scripted dialog with humans and the computer. The scripted computer-human interactions are studied and processed in a labor-intensive manner to train the new spoken dialog service. Such systems are time-consuming and costly to build, thus effectively preventing many companies from participating and receiving the improved customer care service that can be provided.

SUMMARY OF THE INVENTION

What is needed in the art is a help desk service that provides a more natural information exchange between a user and the help desk that increases customer satisfaction. An advantage of the present invention is to enable a natural languages help desk application that provides increased ease of use for customers calling the help desk.

Another advantage of the present invention is to improve customer relationships with companies using a natural language help desk that understands and interacts with users in a more efficient and pleasant manner, especially when handling frequently asked questions. The help desk according to the present invention includes an extended spoken language understanding module that includes further features of handling frequently asked questions.

Embodiments of the present invention include systems, methods and computer-readable medium-stored instructions for providing a voice-enabled interface. In an exemplary embodiment, a voice-enabled help desk service comprises (1) an automatic speech recognition module having a general-purpose acoustic model and a domain-specific model, wherein the general-purpose model is used for bootstrapping at an initial deployment of the voice-enabled help desk service and the domain-specific model is used to adapt the automatic speech recognition module after deployment; (2) a spoken language understanding module that performs text normalization, entity extraction and semantic classification using a boosting approach that balances human-crafted rules with available data, the spoken language understanding module including a frequently asked questions module; (3) a dialog management module that comprises an interpreter, finite state machine engine and an action template; and (4) a natural voices text-to-speech synthesis module for synthesizing speech. The frequently asked questions module handles frequently asked questions from the user by changing voices and providing prompts and answers calculated to move the user from the question back to the main dialog.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

The foregoing advantages of the present invention will be apparent from the following detailed description of several embodiments of the invention with reference to the corresponding accompanying drawings, in which.

DETAILED DESCRIPTION OF THE INVENTION

The present invention may be understood according to exemplary embodiments disclosed herein. When creating a spoken dialog service, experimental results are presented in terms of recognition accuracy, understanding accuracy and call completion rate.

Figure 2:
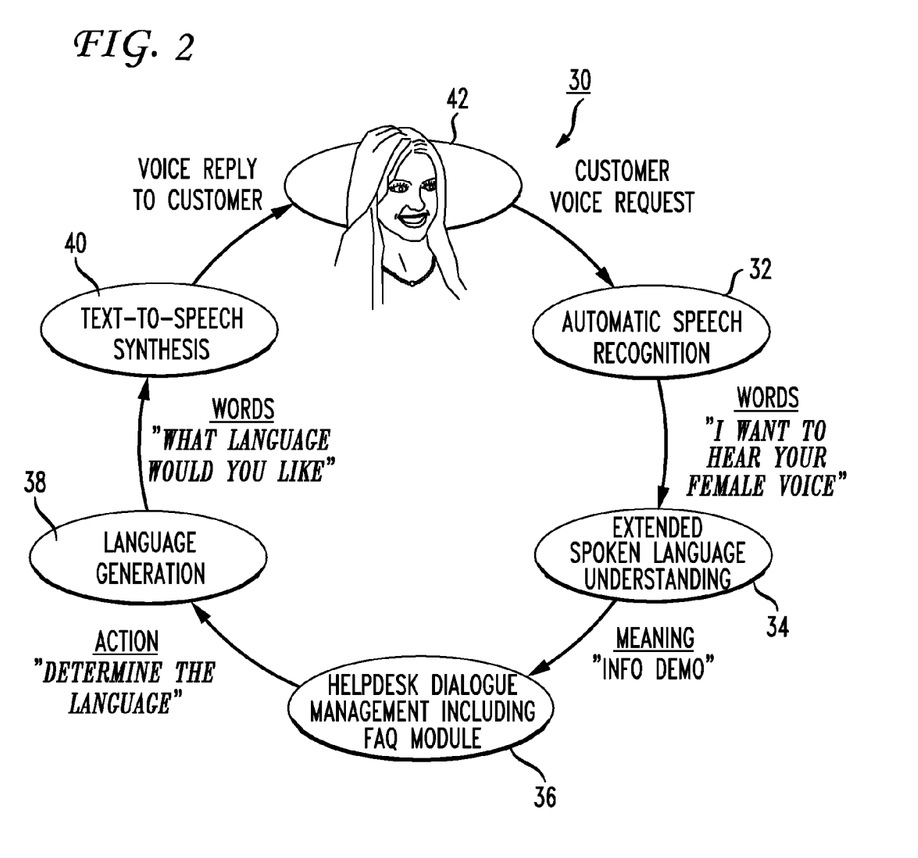
FIG. 2 illustrates the general components used according to the present invention.

There are several technology requirements needed for a voice-enabled help desk application. FIG. 2 illustrates some of the core necessary components of such a system 30, including an automatic speech recognizer (ASR) 32 capable of recognizing large-vocabulary spontaneous speech, an extended language understanding module (SLU) 34 that parses the natural language input into relevant information, a dialog manager (DM) 36 that operates in a mixed-initiative mode, a language generation module 38 and a text-to-speech module (TTS) 40 capable of generating high-quality synthesized voices fonts. For example, AT&T Labs' Natural Voices speech technologies include customized natural voice TTS engines that may be used for a variety of applications.

The present disclosure provides improvements in various modules shown in FIG. 2 that improve the cost, deployment time, customer relationship capability, and overall user experience for help desk applications. The following description provides further information used for building help desk applications quickly and efficiently.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. Accordingly, as used herein, the term "the system" will refer to any computer device or devices that are programmed to function and process the steps of the method.

When initially building a help desk application, an aspect of the process that takes the longest amount of time relates to transcription and annotation of domain-specific speech used in building the underlying recognition and understanding models. "Domain-specific speech" relates to the speech that is within the expected subject matter of a conversation with a person. For example, a travel-related web-site will have "domain-specific" speech such as "destination," "one-way," "round-trip" etc. When the help desk is deployed for a specific purpose or "domain," the recognition and understanding modules can maintain a high level of accuracy.

When a help desk application is being developed for a company, information about that company must be gathered in order to train the recognition and understanding modules. The process for collecting and annotating speech data is not only expensive and laborious; it delays the deployment cycle of new services. The process according to the present invention of building help desk services begins by "mining" and "reusing" data and models. Data mining is done not only from other similar application domains such as telecommunications, insurance, airline, etc, but also from relevant emails, web pages and human/agent recordings. See U.S. patent application Ser. No. 10/326,691 for more details regarding this process.

As part of the labeling process, sentences are annotated for speech understanding purposes. The sentences, as mentioned above, can come from any source such as emails or web-site data. This is done in two phases. The first phase includes identifying and marking domain-specific and domain-independent value entities such as phone numbers, credit card numbers, dates, times, service offerings, etc. The second phase includes associating each input sentence with one or more semantic tags (or classes) that identify the "meaning" of a user's request. These tags can be both general and application-specific and are structured in a hierarchical manner. For example, phrases such as "may I hear this again" and "yes what products do you offer" can be tagged as "discourse_repeat"' and "discourse_yes, info_products" respectively.

Regarding the automatic speech recognition module 32, accurate recognition of spoken natural-language input for help desk applications requires two components: (1) a general-purpose subword-based acoustic model (or a set of specialized acoustic models combined together), and (2) a domain-specific stochastic language model (or a set of specialized language models). Creating help desk applications imposes two challenges in building these models. The present invention enables the ability to bootstrap the service during an initial deployment.

Once all the available data is obtained, and the phases of (1) identifying and marking domain-specific and domain-independent value entities and (2) associating each input sentence with one or more semantic tags (or classes) that identify the "meaning" of a user's request are complete, the system can be initially deployed. While the recognition accuracy is not always at an acceptable level at this stage, often enough data can be gathered from company emails and web-site data to at least deploy the help desk application.

The invention provides for adapting the help desk service as task-specific data becomes available through live use of the service. In the case of acoustic modeling, according to the present invention, the help desk ASR 32 engine initially uses a general-purpose context-dependent hidden Markov model. This model is then adapted using a Maximum a posteriori adaptation once the system is deployed in the field. See, e.g., Huang, Acero and Hon, *Spoken Language Processing*, Prentice Hall PTR (2001), pages 445-447 for more information regarding Maximum a posteriori adaptation.

When generating the ASR module 32, stochastic language models are preferred for providing the highest possibility of recognizing word sequences "said" by the user 42. The design of a stochastic language model is highly sensitive to the nature of the input language and the number of dialog contexts. A stochastic language module takes a probabilistic viewpoint of language modeling. See, e.g., Id., pages 554-560 for more information on stochastic language models. One of the major advantages of using stochastic language models is that they are trained from a sample distribution that mirrors the language patterns and usage in a domain-specific language. A disadvantage of such language models is the need for a large corpus of data when bootstrapping.

Task-specific language models tend to have biased statistics on content words or phrases and language style will vary according to the type of human-machine interaction (i.e., system-initiated vs. mixed initiative). While there are no universal statistics to search for, the invention seeks to converge to the task-dependent statistics. This is accomplished by using different sources of data to achieve fast bootstrapping of language models including language corpus drawn from, for example, domain-specific web site, language corpus drawn from emails (task-specific), and language corpus drawn a spoken dialog corpus (non-task-specific).

The first two sources of data (web sites and emails) can give a rough estimate of the topics related to the task. However the nature of the web and email data do not account for the spontaneous-speech speaking style. On the other hand, the third source of data can be a large collection of spoken dialog transcriptions from other dialog applications. In this case, although the corpus topics may not be relevant, the speaking style may be closer to the target help desk applications. The statistics of these different sources of data are combined via a mixture model paradigm to form an n-gram language model. See, e.g., Id., pages 558-560. These models are adapted once task-specific data becomes available.

Regarding the text-to-speech synthesis module 40, the extensive call flow in help desk applications to support information access and problem solving, and the need to rapidly create and maintain these applications, make it both difficult and costly to use live voice recordings for prompt generation. The TTS module 40 plays a critical role in the new breed of natural language services where up-to-the-minute information (e.g., time and weather) and customization to an individual's voice are necessary. According to the present invention, the TTS module 40 provides a large variety of distinctive voices and, within each voice, several speaking-styles of many different languages. This is helpful for "branding" of help desk services.

The TTS engine 40 uses AT&T Labs Natural Voices technology and voice fonts. See, e.g., M. Beutnagel and A. Conkie and J. Schroeter and Y. Stylanianou and A. Syrdal, "The AT&T Next Generation TTS System", *Joint Meeting of ASA, EAA and DAGA,* 1999. Due to automation of the voice creation process, new and customized voice fonts can be created in less than a month. Including task-specific data (i.e., materials relevant to the application) can assure a higher quality TTS voice.

For example, the main voice font used in an exemplary help desk TTS engine 40, named "Crystal", is trained with over 12 hours of interactive dialogs between human agents and customers. In the help desk application described below, over 8 different voice fonts have been used within the same application for presenting different languages and dialog contexts. Any number of different voice fonts may be provided in a help desk application.

Regarding the spoken language understanding (SLU) module 34, text normalization is an important step for minimizing "noise" variations among words and utterances. This has the potential of increasing the effective size of the training-set and improving the SLU 34 accuracy. The text normalization component is essentially based on using morphology, synonyms and other forms of syntactic normalization. The main steps include stemming, removal of disfluencies, non-alphanumeric and non-white space characters and using a synonyms dictionary.

An important functionality of an SLU module 34 is the ability to parse the input speech into meaningful phrases. Parsing for help desk applications is simplified to a process of identifying task-specific and task-independent entities (such as phone numbers, credit card number, product type, etc.). Each entity module is built using standard context-free grammar that can be represented by a finite state transducer. Following text normalization, the system identifies entities by composing each input text string with all active entity modules. For example, the sentence "my bill for January $2^{nd}$" is parsed as "my bill for <Date> January $2^{nd}$ </Date>". Entity extraction not only helps to provide the DM 36 with the necessary information to generate a desired action but also it provides some form of text normalization for improving the classification accuracy.

Figure 3:
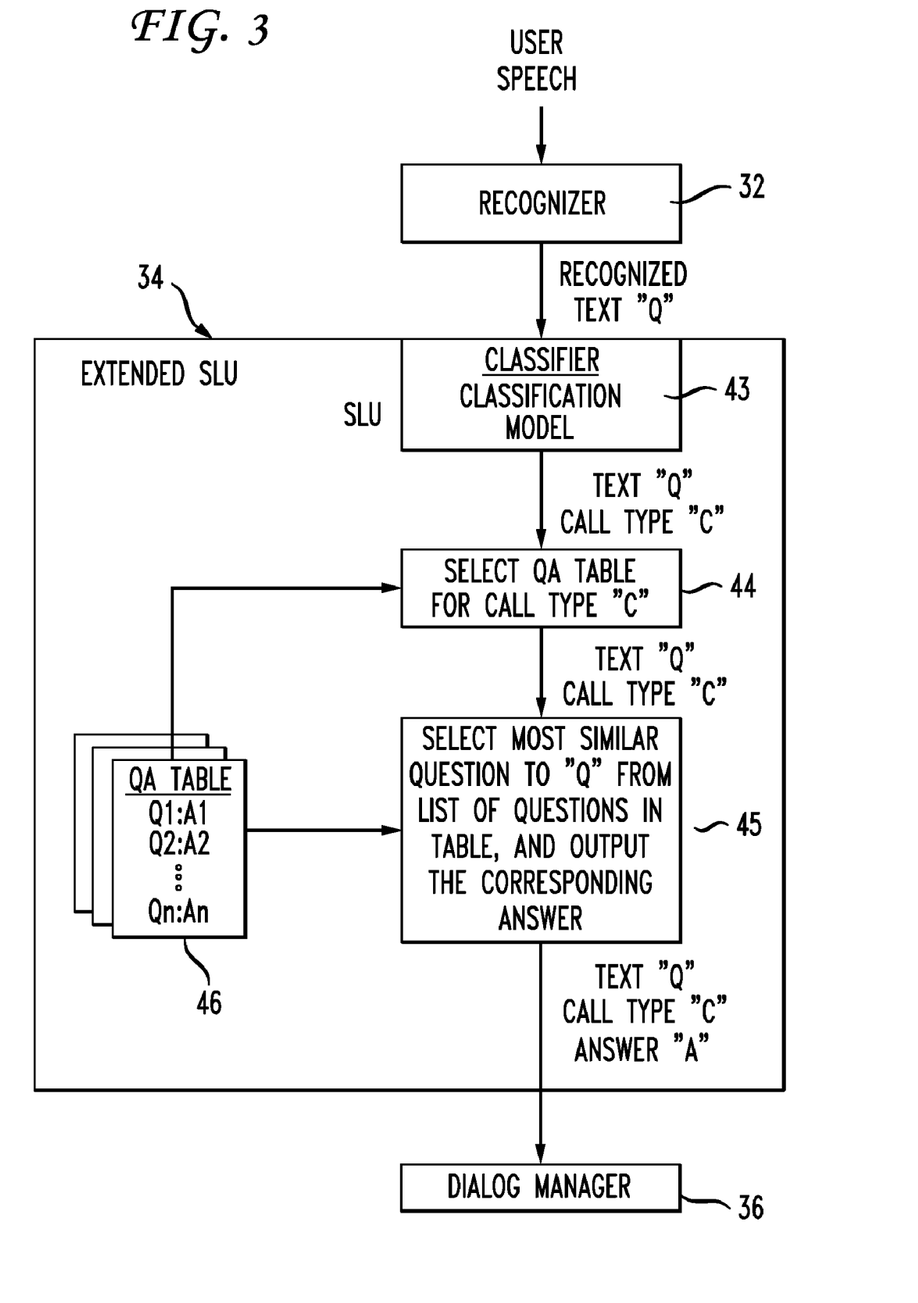
FIG. 3 illustrates an extended SLU module according to an aspect of the present invention.

FIG. 3 illustrates an extended SLU module 34 for use in applications such as a help desk. The extended SLU 34 enables a more efficient means for responding to frequently asked questions. Customer care services that use natural language understanding technology to perform call routing are typically limited to 10-100 call types (categories). The low number of categories and the lack of deeper understanding of the input limit these systems from providing sufficiently detailed information about the task. Typically, it is therefore not possible to answer users' specific questions directly. Instead, most systems give very general answers, and users are left to deduce the answer to their specific questions.

In an aspect of the present invention, a method extends the capabilities of natural language dialog systems to directly answer users' specific questions without increasing the number of call types. Referring to FIG. 3, in a spoken dialog system, user utterances are transformed into text "Q" via an ASR 32. The SLU module 34 converts this text into a semantic representation, based on which a DM module 36 decides the next action to take or next prompt to play to the user. A classifier-based SLU 34 classifies the input using a classification module 43 into one or many pre-determined call types "C" that form the basis of the DM's 36 next action.

The extended SLU 34 processes the output from the classification module 43 by selecting data from a question and answer (QA) table 46 for the call type "C". In one aspect of the invention, a plurality of QA tables is stored and available from which to select a particular QA table according to the call type "C." Once the QA table is selected, the system searches 44 the QA table for a question similar to the current utterance or text "Q". The QA table stores a series of corresponding answers to various questions. The SLU 34 selects the most similar question to the text "Q" from the QA table and outputs the corresponding answer 45. If a question with a high enough similarity is found in the QA table 46, the system selects the most similar question to "Q" from a list of questions in the table. The text "Q", call type "C" and answer "A" are transmitted to the DM 36.

An example of the process of performing the FAQ similarity computation follows. In an initialization process, each question $FAQ_j$ in the QA table is represented as a vector: $(faq_{j1}, faq_{j2}, faq_{j3}, --- faq_{jm})$ assuming there are "m" unique words in all the questions in the QA table. The term $faq_{j1}$ equals $tf_{ji}$ times $idf_i$, where $tf_{ji}$ is the term frequency of $word_i$ (1 if $word_i$ is present, 0 if it is absent in $FAQ_j$). The term $idf_i$ is defined as an inverse document frequency of $word_i$ and equals log $N/(n_i)$. The term N is the total number of questions in QA table and $n_i$ is the number of questions containing the $word_i$.

$$Sim(Q, FAQ_j) = \frac{\sum_i q_i \cdot faq_{ji}}{\sqrt{\sum_i (q_i)^2 + c(0.5)^2} \cdot \sqrt{\sum_i (faq_{ji})^2}}$$

For each incoming question Q to be answered, a system operating according to the present invention performs the following steps: (1) calculating a vector representation of the question Q $(q_1, q_2, q_3, --- q_m)$, wherein $q_i$ equals $tf_i$ times $idf_i$ and $tf_i$ is 1 if $word_i$ is present and 0 if it is absent in the question Q. The term $idf_i$ is the inverse document frequency of the $word_i$, calculated above during the initialization process; (2) finding the number of words "c" in the incoming question that are not found in the "m" unique words seen in the all FAQs in the QA table; (3) for each question $FAQ_j$ in the QA table, calculating a similarity computation:

(4) selecting the $FAQ_j$ that has maximum value of $Sim(Q, FAQ_j)$; and (5) reading the corresponding answer from QA table. In this manner, a system operating according to the present invention will perform the similarity computation according to the above description of initialization and for each incoming question calculating and processing a similarity value for use in selecting the appropriate answer from the QA table. This particular similarity computation is an example of one of many similarity computational methods that may be used. Accordingly, the inventors recognize that unless specifically claimed, the particular similarity computation is not limited to the above formula.

Using the above-mentioned principles, a dialogue and classification of questions can take place. For example, an utterance like "Can your software run on Linux" is classified as a call type "tech_compatibility". One could argue that it should be classified as Linux_compatibility, but such a classification would require Windows_compatibility, Unix_compatibility, etc. Classification base SLUs are ill suited for such an explosion in call types.

As another example of the process, suppose the phrase "Can I hear a female custom voice demonstration . . . hum . . . in Spanish?" is input to the SLU 34. The SLU 34 output may look like:

- <!-- Spanish Custom Female and default Demo (Male not available) -->
- <spanishCustomFemale mode="queued">
    <prompt id="intro" type="TTS" src="HelpDesk: Prompts:demo_1004_pc_v4"
    file="../prompts/demo_1004_pc_v4.ul">OK, I can show you our female voice in Spanish. This voice will be available with Release 1.1 on December first.</prompt>
    <prompt id="voiceFemale" type="TTS"
    src="HelpDesk:Prompts:demo_1014_pc_v1"
    file="../prompts/demo_1014_pc_v1.ul">Here it is.</prompt>
    <audio src="system:sounds:sil500 ms"/>
    <audio src="HelpDesk:DemoVoices:spanish_f1"/>
    <prompt id="end" type="TTS" src="HelpDesk:Prompts: demo_1006_pc_v2"
    file="../prompts/demo_1006_pc_v2.ul">If you're interested in talking to someone about our Spanish voice, just ask for sales.</prompt>
    <var name="rejection" value="0" />
    <var name="maxRejection" value="1" />
    </spanishCustomFemale>The above XML output only serves as an example of one way the invention may be implemented. This particular implementation is not meant to be limiting of the scope of the invention.

In previous systems, the dialog manager responds to the question "Can your software run on Linux?" by playing a prompt that informs the user of all the platforms the software is compatible with, even though the user wanted to know only about Linux. An aspect of the present invention enables the system to generate a more appropriate answer to the question, such as: "Yes, our software can run on Linux".

As shown in FIG. 3, the SLU 34 is extended to allow such responses by being provided with the QA table 46, possibly one for each call type. These can be viewed as frequently asked questions and their answers, possibly partitioned by call types.

To measure the similarity between user questions and questions in the QA Table 46, the system uses cosine similarity within the vector space model well known in the information retrieval field. According to the present invention, the system normalizes the vectors with the query length. As mentioned above, classifier-based SLUs and information retrieval technology are well known in the state of the art. This aspect of the invention combines classifier-based SLUs and information retrieval technology to answer direct questions.

The innovations disclosed herein allow development of effective spoken dialog-based help desks. They allow improvements in the question answering capability, simply by adding new questions and answers in the QA tables 46. Such capabilities can reduce the cost of customer support for companies and provide a mechanism for inserting immediate information into the system without involving any alteration to the ASR, SLU or the DM modules. Further information regarding the QA table 46 and answering frequently asked questions will be provided below with reference to FIG. 6.

An aspect of the present invention relates to semantic classification of utterances. The system categorizes each utterance into one or more semantic classes. A machine learning approach is taken for this task. The classifier 43 is trained using a corpus of collected utterances that have been annotated using a predefined set of semantic tags.

To train an exemplary classifier 43 according to the present invention, the system uses a technique called boosting. The basic idea of boosting is to combine many simple and moderately inaccurate prediction rules into a single rule that is highly accurate. Each of the base rules is trained on weighted versions of the original training set in which the "hardest" examples—i.e., those that are most often misclassified by the preceding rules—are given the greatest weight. The base rules are then combined into a single rule by taking a kind of majority vote. The first practical and still most widely studied boosting algorithm is Freund and Schapire's AdaBoost algorithm. See, e.g., Y. Friend and R. E. Schapire, "A decision-theoretic generalization of on-line learning and an application to boosting", *Journal of Computer and Systems Sciences*, 1997, for an overview of work on boosting.

In a preferred embodiment of the invention, the system uses an implementation of boosting developed by Schapire and Singer called BoosTexter. See, e.g., U.S. Patent Application No. 60/306,283, incorporated by reference above. In this implementation, each rule makes its predictions based simply on the presence or absence of a word or short phrase in the utterance. Like most machine-learning methods, boosting is heavily data driven, and so requires a good number of examples.

In developing help desk applications, it is often necessary to deploy the system before a sufficient number of examples have been collected. To get around this difficulty, the present invention uses human knowledge to compensate for the lack of data. In particular, the system uses a modification of boosting developed by Schapire et. al. that admits the direct incorporation of prior knowledge so that a classifier 43 is built by balancing human-crafted rules against what little data may be available. See the patent applications incorporated above for more information on using prior knowledge to boost the development of the classifier 43.

The human-built rules have a simple form and need not be perfectly accurate; for instance, one rule may state that if the word "demo" occurs in the utterance, then the user probably wants to hear a demonstration of some sort. Incorporating prior knowledge in a probabilistic fashion allows rapid deployment and a more effective way to add new tags throughout service evolution.

Figure 4:
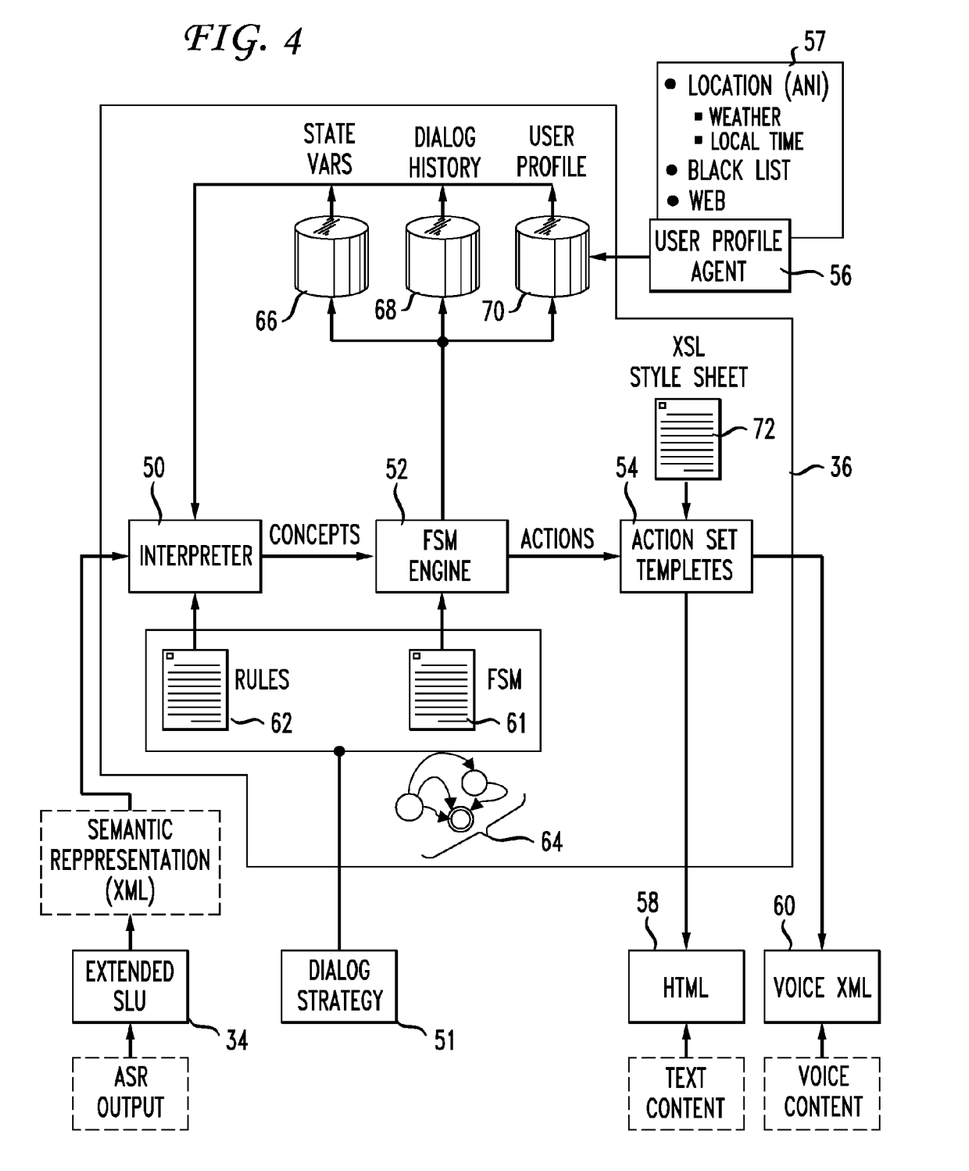
FIG. 4 illustrates an exemplary dialog manager architecture for use in the present invention.

Regarding the DM module 36, significant challenges exist on how to build and easily maintain large-scale voice-enabled applications. The DM module 36 is designed according to the present invention to address the challenges of building voice-enabled applications. FIG. 4 illustrates an example of the architecture for the DM 36 of the present invention. The DM 36 is a particularly important issue for help desk applications where the nature of the information can be constantly changing. The complexity of the dialog modeling and the lack of adequate authoring tools can compromise the value and effectiveness of an automated help desk service.

The approach proposes, through general dialog patterns, a unified view to represent a human-machine dialog flow structure of commonly accepted reference models for mixed-initiative systems. A general engine operates on the semantic representation provided by the extended SLU 34 and current dialog context 51 (dialog strategy) to control the interaction flow. To describe the human-machine interaction, the system extends the traditional approach of finite state machines (FSM). FSSMs are attractive mechanisms for dialog specification since they are (a) a direct translation of call flow specifications, (b) easy to augment with specific mixed-initiative interactions (c) practical to manage extensive dialog context. However, the use of FSM as mechanisms for managing the dialog flow is discussed, other means are also contemplated for this process. For example, dialog motivators may also be used as well as other mechanisms that are developed.

FIG. 4 illustrates the FSM engine 52 and FSM 64 in the DM 36 according to the present invention. The SLU module 34 processes the ASR output into, for example, the semantic representations in XML. The DM 36 shown here includes modules such as an interpreter 50, FSM engine 52, and action set templates 54. The FSM engine 52 controls the actions taken in response to the interpreter 50 output. Within the FSM structure, each information state provides support for general user interface patterns such as correction, start-over, repeat, confirmation, clarification, contextual help, and context shifts. Topic tracking is a feature that provides the infrastructure for rendering information. General conversation topics are managed by a subdialog that (a) handles, in a declarative way, new topics, (b) specifies the level of details per topic, and (c) allows context shift to take place at any point in the dialog.

According to the present invention, a dialog D is a tuple presented by the following expression $D=<q_0, Q, F, \Theta, \delta>$ where $q_0 \in Q$ is the initial state, Q is a finite set of nodes, $F \subseteq Q$ is a set of final nodes, $\Theta$ is the semantic representation produced by the interpreter 50, $\delta: Q \times \Theta \to Q$ is a transformation function $q'=\delta(q,i)$, where q, q' are respectively the current and the next state and i is the current concept. The history mechanism can be modeled with the following tuple $H=<T, C, \phi>$ where T is the set of the current and past dialog turns including states variables and produced actions, c is the set of checkpoints or rollback states and $\phi: T \times C \to \{true, false\}$ is a Boolean function retuning true or false depending on the rollback strategy. Finally, the interpreter 50 maps to a tuple $\Theta=<\Re, H, \Sigma, \sigma>$, where $\Re$ is a set of logical predicates, H is the dialog history, $\Sigma$ is the set of input concepts and system events (e.g., semantic frames or slots), $\sigma: \Re \times H \to \Sigma$ is a transformation function $i=\sigma(\bar{r}, h)$ where $\bar{r}$ is the set of rules that applies to the input frame and h is the current dialog history.

The interpreter 50 is responsible for providing a semantic interpretation of the concept categorization and the named entities provided by the SLU module 34. Logical predicates described in the rules file 62 allow the interpreter 50 to rank classes and assign a contextual interpretation to the input. An example of the output from the interpreter 50 follows:

if (slu.info_demo) {
    demo = getDemo("female","custom","spanish")
    n = history(demo)
    if (n>=0 && n<maxDemo) // demo already presented
      return demo[n]
    else return noMoreDemo
    }

The interpreter 50 also has access to the state variables 66, the dialog history 68 and user profiles 70. The user profile communicates with a user profile agent 56 that uses information 57 associated with the location of the user, the weather or local time for the user, or a black list of users or web content. The history mechanism model allows the DM 36 to capture situations where the request is under-specified or too general. For example, if the current topic has a missed mandatory attribute, the dialog engages a clarification sub-dialog in order to provide the missed information. Moreover, the history provides support for correction (rollback one dialog turn) or repeat requests. This last feature includes both explicit and semantic repeat requests. Situations where the user utters "please repeat that" or "what was the cost?" are then handled correctly by repeating the previous repeatable information.

An action template 54 receives actions as a result of the operation of the FSM engine 52. The action template 54 represents a template-based output generator. An XML-markup language describes the dialog actions (e.g., prompting, grammar activation, database queries, and variable values updates) and the topic structures. New topics and subtopics can be added, removed or updated at this level without changing the basic service logic. At run-time, the system translates the output by a XSL style sheet 72 either to Voice XML 60 (voice content through means such as a telephone service) or to HTML 58 (text content) for output authoring. In this way, the presentation layer and the dialog structure for the topic sub dialog are completely separated from the service logic and are easy to maintain with traditional authoring tools.

Figure 5:
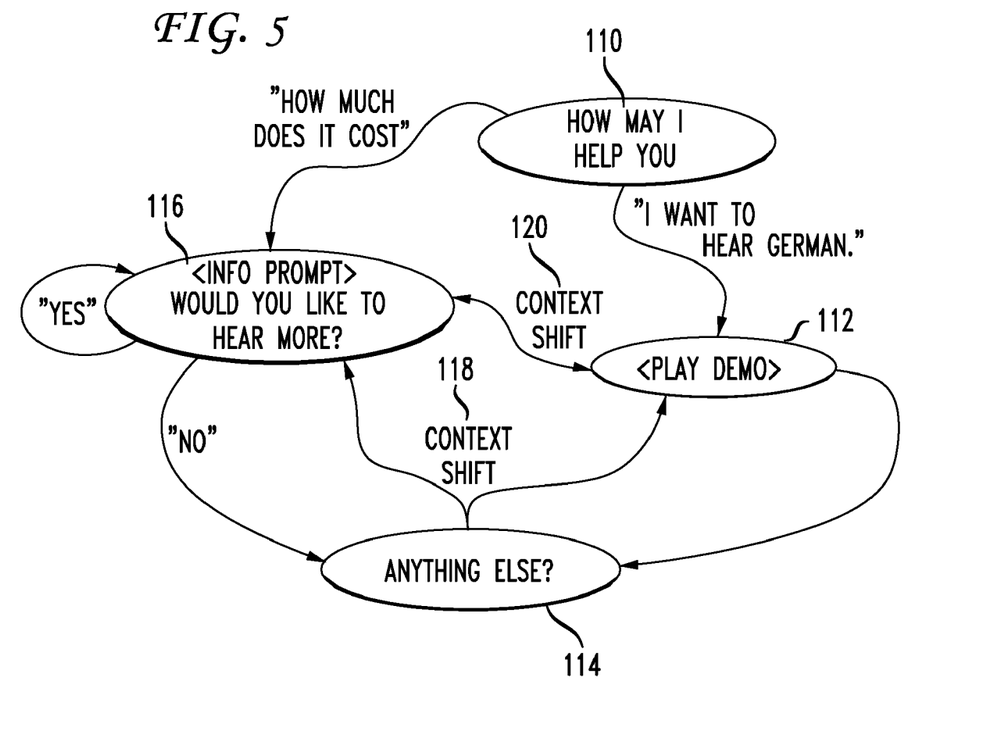
FIG. 5 illustrates a high-level user interface according to an aspect of the invention.

An important aspect of the present invention relates to the User interface ("UI"). The UI is what the customer experiences when interacting with a system and plays an important role in providing quality service and user experience. There are two aspects in UI design for help desk applications: (a) usability goal—increasing the likelihood of call completion with minimal user confusion by supporting context shift in the dialog, providing information and help whenever necessary, and by learning how users interact with the system and propagating that knowledge into improving the various technology components; and (b) personality—creating an agent personality from synthesized speech that often lacks emotions. The system, according to an aspect of the present invention, uses a screenwriting dialog technique where a back story is created for the agents based on a set of desired personality traits (e.g., cheerful, trustworthy, calm, strong-willed, helpful, etc). As an example, a one-page description of the agent life history may be described and prompts are written "in-character". A back story for an agent may be reflected in the agent making statements such as "I have to admit I'm having problems understanding you," "Let's stop for just a quick second," or "I honestly can't image using anything but the best!" A plurality of different synthesized voices can be used conveying different information to the user. For example, an application may employ eight different voices for communicating different kinds of information to the user. The dialog strategy begins with the phrase "How May I Help You?" The system supports natural language input and context shift throughout the application. In the service application described below, several different opening prompts are deployed which help to analyze user feedback and how that is affected throughout the course of the dialog. For example, the top-level prompts can be of the category of demonstration and command-like hints: "Hi you are listening to AT&T Labs Natural Voices text to speech. I can show you a demo or answer your questions on topics like general information, pricing, or new languages. Don't hesitate to interrupt me at any time. Now, how can I help you?"

Another category of top-level prompts is to promote a request for a demo only: "Hi you are listening to AT&T Labs Natural Voices text to speech. I can show you a demo or answer your questions. Now, how can I help you?" Or, the prompt can be designed to elicit questions regarding a demo or some hints on how to ask questions: "Hi you are listening to AT&T Labs Natural Voices text to speech. I can show you a demo or answer your questions. For example, you can ask me about the products we sell or how much they cost. Now, how can I help you?" The various categories of top-level prompts and the examples above have been shown to mold and affect the user's requests. For example, studies show that the word content in user utterances varies for each category of top-level prompt. Accordingly, the particular phrases used in the dialog are chosen to prompt the user to use certain phrases or terms that are more likely to be understood by the system. FIG. 5 illustrates an exemplary high-level UI for a help desk application. In this case, the dialog begins with "How may I help you?" 110. The user may provide several responses. Suppose that the user says "I want to hear German." A <play demo> routine 112 then runs to provide an example of German. Following this step, the system sends the user 42 to the prompt "anything else?" 114. If the user says "how much does it cost?", then the system plays an <info prompt> and asks "Would you like to hear more?" 116. A "yes" returns the state to the <info_prompt> and question of wanting to know more and a "no" forwards the user to the prompt "anything else?" 114. From the prompt 114, a context shift 118 may occur where the user may ask for information or to hear another demonstration. Similarly, a context shift may occur between the prompt 116 and the state designated to play the demonstration 112.

An exemplary help desk application relates to a service for the AT&T Labs Natural Voices—a business that specializes in selling and marketing TTS products and voice fonts. The so-called TTS help desk took less than three months to design, develop and test. At one point following deployment, the TTS help desk received over 1000 calls per month from business customers. The service performs call routing to specialized agents (such as sales, technical, customer service) and provides information about the various products and services. The system also provides callers with a variety of demonstrations of the different voice fonts and languages.

An aspect of the present invention is the process of creating such help desk application. The initial data collection effort in building the help desk is primarily based on a large set of email interactions that took place prior to launching the business. Utterances stored from conversations associated with the products and services are manually extracted and annotated using a set of 62 broad semantic tags that describe the types and characteristics of the products and services the business was able to support. These tags are categorized into broader groupings such as agent, general information, help, technical and web site. Presented below are some benchmark results for the TTS help desk: (a) ASR, (b) question/answering, and (c) task completion rates, on a set of 1000 dialogs.

After the deployment of the TTS help desk, ASR results can be analyzed. Detailed analysis of the corpus shows that it exhibits a mixed sample of two language styles: key phrases and spontaneous language. The average number of user turns is 3.3 with 27% of users engaging longer interactions than average. Although there are roughly 75 possible prompts on each dialog turn, in studies the prompt contexts have been clustered into four types: generic, confirmation, language and help. Each context corresponded to a stochastic language model and was bootstrapped in three different ways: using web data, email data or an inventory of a human-machine (HD) database acquired from other dialog applications.

Figure 6:
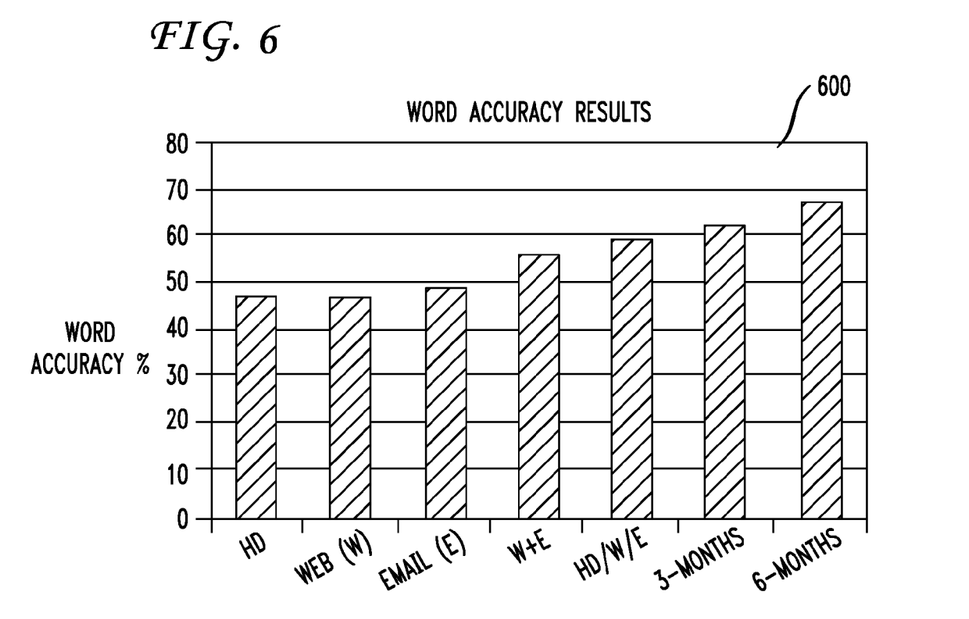
FIG. 6 illustrates word accuracy results.

FIG. 6 shows 600 overall word accuracy of the TTS help desk system on the 1000 dialog interactions. These results show that the help desk was able to achieve 59% word accuracy without any formal data collection. When sufficient data was available (after 6 months from system deployment), the accuracy jumped to nearly 68%.

Help desk applications that are available on the web often provide an extensive list of Frequently Asked Questions (FAQs) to help users access detailed information in a straightforward manner. In text understanding, there are many systems that exist today that perform question/answering. For example, the AT&T IO-NAUT system (see can provide answers to queries requesting entity information such as names and dates.

According to the present invention, the system incorporates a question/answering module to help users with task-specific FAQs. The FAQ module may be incorporated in the SLU 34 as shown in FIG. 4 or may be associated with another element of a spoken dialog system. In a preferred embodiment, the QA module is provided in the form of a QA table 46 as shown in FIG. 4, wherein the questions and answers are extracted from previous callers to the system. The accuracy of this module is improved by partitioning the table into smaller subsets, each corresponding to a semantic tag. During a test call, if a user asks a question which matches closely to one found in the QA table, the answer is automatically passed to the DM 36 along with any semantic tags (from the classifier) and entities. String matching is performed using cosine similarity within the vector space model well known in the information retrieval field. Better matching accuracy was observed if normalization of the vectors is carried out with the query length as opposed to the entire data set.

Regarding the question and answer results among some data collected by the inventors of the present invention, a small set of 250 questions from one specific tag were identified as potential FAQs and grouped into 81 distinct sets. Thus, for each answer there were potentially one or more questions. Given a question with a specific semantic tag, the task was to identify whether the system can identify the appropriate answer. The 81 sets of questions constituted as the training set were indexed using a vector space model. The test set consisted of 336 questions of which only 69 corresponded to valid questions, and the remaining are added to evaluate the robustness of the technique. At a given operating point, precision and recall were computed at 0.9 and 0.94, respectively, thus providing evidence of the effectiveness of the question-answering aspects of the present invention.

The benefits of the help desk system and method disclosed above have been shown since a bootstrapped system, after three months of deployment, illustrated an average 85% task completion rate. Although the functionalities of the system were continuously changing during that period of time, the successful statistic shows consistent improvement in the system. Results show that (a) the ASR accuracy which was initially at 59% through bootstrapping was improved to 68% following 6 months of system deployment; b) question/answering results were at 0.9 and 0.94 for precision and recall, respectively; and (c) the latest release of the system performs at 84% and 85% semantic classification rate and task completion rate, respectively. These statistics only provide some information regarding the success of the approaches described above and are not meant to be limiting in any manner given that further research and refinement of the inventive concepts will improve the accuracy of help desk applications. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method of responding to user utterances in a spoken dialog service, the method comprising:
   receiving a user utterance;
   identifying a question and an answer selected from a question and answer table based on a similarity computation that calculates a similarity between the user utterance and at least one question in the question and answer table and a set of words in the user utterance that are not found in a set of unique words in the question and answer table; and
   presenting an answer to the user utterance from the identified question and answer, wherein the identified question and answer is output to a dialog management module and wherein the similarity computation further comprises:

$$Sim(Q, FAQ_j) = \frac{\sum_i q_i \cdot faq_{ji}}{\sqrt{\sum_i (q_i)^2 + c(0.5)^2} \cdot \sqrt{\sum_i (faq_{ji})^2}}$$

wherein the term $faq_{ji}$ represents the questions in the question and answer table and the term $q_i$ represents the user utterance and c is the set of words.

2. The method of claim 1, further comprising:
   classifying recognized text associated with the user utterance; and
   selecting the question and answer table from a plurality of question and answer tables according at least to the classified text.

3. The method of responding to utterances in a spoken dialog service of claim 1, wherein the identified question and answer output is selected according to a most similar question to the received utterance.

4. The method of responding to utterances of claim 1, wherein the answer is selected from the selected question and answer table as being associated with a question that is the most similar to the received utterance.

5. The method of responding to utterances of claim 1, wherein each question and answer table includes questions and associated answers.

6. A computer-readable medium storing a computer program having instructions for controlling a computing device associated with a spoken dialog service to perform the steps of:
receiving a user utterance;
identifying a question and an answer selected from a question and answer table based on a similarity computation that calculates a similarity between the user utterance and at least one question in the question and answer table and a set of words in the user utterance that are not found in a set of unique words in the question and answer table; and
presenting an answer to the user utterance from the identified question and answer, wherein the instructions further comprise:
outputting the identified question and answer to a dialog management module and wherein the similarity computation further comprises:

$$Sim(Q, FAQ_j) = \frac{\sum_i q_i \cdot faq_{ji}}{\sqrt{\sum_i (q_i)^2 + c(0.5)^2} \cdot \sqrt{\sum_i (faq_{ji})^2}}$$

wherein the term $faq_{ji}$ represents the questions in the question and answer table and the term $q_i$ represents the user utterance and c is the set of words.

7. The computer-readable medium of claim 6, wherein the instructions further comprise:
classifying recognized text associated with the user utterance; and
selecting the question and answer table from a plurality of question and answer tables according at least to the classified text.

8. The computer readable medium of claim 6, wherein the identified question and answer output is selected according to a most similar question to the received utterance.

9. The computer-readable medium of claim 6, wherein the answer is selected from the selected question and answer table as being associated with the question that is most similar to the received utterance.

10. The computer-readable medium of claim 6, wherein the question and answer table includes questions and associated answers.

11. A computing device for responding to utterances in a spoken dialog service, the computing device comprising:
a module configured to receive a user utterance;
a module configured to identify a question and answer selected from a question and answer table based on a similarity computation that calculates a similarity between the user utterance and at least one question in the question and answer table, a set of words in the user utterance that are not found in a set of unique words in the question and answer table; and
a module configured to present an answer to the user from the identified question and answer, wherein the identified question and answer is output to a dialog management module, and wherein similarity computation further comprises:

$$Sim(Q, FAQ_j) = \frac{\sum_i q_i \cdot faq_{ji}}{\sqrt{\sum_i (q_i)^2 + c(0.5)^2} \cdot \sqrt{\sum_i (faq_{ji})^2}}$$

wherein the term $faq_{ji}$ represents the questions in the question and answer table and the term $q_i$ represents the user utterance and c is the set of words.

12. The computing device of claim 11, further comprising:
a module configured to classify recognized text associated with the user utterance; and
a module configured to select the question and answer table from a plurality of question and answer tables according at least to the classified text.

13. The computing device of claim 11, wherein the identified question and answer output is selected according to a most similar question to the received utterance.

14. The computing device of claim 11, wherein the answer is selected from the selected question and answer table as being associated with a question that is the most similar to the received utterance.

15. The computing device of claim 11, wherein the question and answer table includes questions and associated answers.

* * * * *